United States Patent Office 3,471,420
Patented Oct. 7, 1969

3,471,420
ACETONE-FORMALDEHYDE AND PHENOL-ACETONE-FORMALDEHYDE RESINS EXTENDED WITH ANIMAL BLOOD OR SOY FLOUR AND OIL-IN-WATER EMULSION
Craig C. Campbell, Cherry Hill, N.J., assignor to Mobil Oil Corporation, a corporation of New York
No Drawing. Filed July 15, 1966, Ser. No. 565,408
Int. Cl. C09j 3/16, 3/19, 3/24
U.S. Cl. 260—7     4 Claims

ABSTRACT OF THE DISCLOSURE

Water-soluble ketone-aldehyde and phenol-ketone-aldehyde resin binders are extended and rendered more sprayable with animal blood or soy flour and an oil-in-water emulsion.

---

This invention relates to binders for composition boards. It is more particularly concerned with a sprayable thermosetting resin binder composition.

As is well known to those familiar with the art, a wide variety of composition boards have been produced by bonding composition board-forming materials with suitable binders. Such boards include chip board, particle board, and fiber-board (hard board). In this specification and the claims, "composition board-forming materials" are materials, such as fibers, particles, and mixtures of fibers and particles. The terms "fibers" and "particles" encompass a wide variety of materials of mineral and vegetable origin, and synthetic organic fibers like Dacron and nylon. Typical minerals from which such board-forming materials can be made include gypsum, asbestos, fiberglass, and the like. Generally, however, composition boards are made by bonding fibers and/or particles of vegetable origin, usually cellulosic materials, into desired configurations. The term "cellulosic," as used herein, is embracive of various plants and trees that contain the lignocellulosic complex. Within the term "cellulosic materials," therefore, as used herein, are contemplated fibers, chips, shavings, sawdust, and the like derived from various plants and trees, including hard woods, soft woods, cotton bagasse, kenaf, hemp, and jute.

A variety of materials have been proposed for use as binders for fibers and particles. Materials that can be thermoset to provide an infusible binder, i.e., "thermosetting resins," lending greater strength and durability to the bonded products are highly desirable. Phenol-formaldehyde, urea-formaldehyde, and melamine-formaldehyde resins are among the numerous thermosetting resins that have been proposed for such uses.

In copending application Ser. No. 310,920, filed Sept. 23, 1963, now abandoned, there has been disclosed a novel class of thermosetting water-soluble ketone-aldehyde resins. In copending application Ser. No. 354,435, filed Mar. 24, 1964, now U.S. 3,390,127, there has been disclosed a novel class of thermosetting water-soluble ketone-phenol-aldehyde resin binders. In copending application Ser. No. 369,008, filed May 20, 1964, now U.S. 3,412,068, there has been disclosed a similar class of resin binders, wherein part of the phenol has been replaced with resorcinol. These resins are good binders for the manufacture of construction boards, and they are relatively inexpensive, compared to phenolic resins.

In order to reduce the cost of binder material resort has been had to the use of fillers, such as finelly-divided lignocellulosic material. For plywood application, proteinaceous material, such as soluble blood, has been used with phenolics. Soluble blood is not very compatible with phenolics, however, but this is not particularly disadvantageous in plywood applications wherein the binder is applied by roller in a pasty form. In the case of composition board manufacture, on the other hand, spray application is used. Thus, incompatible formulations, such as phenolics and blood cannot be used, because of likelihood of clogging spray nozzles.

It has been found that the binders described in the aforementioned copending applications are compatible with blood and other proteins, but blood tends to thicken the binder solution. It has been discovered that such thickening can be overcome by incorporating an amine, which acts as thermosetting catalyst and solvent, and an oil-in-water emulsion.

Accordingly, it is an object of this invention to provide a novel binder composition for composition board. A specific object is to provide a binder composition of water-soluble ketone-aldehyde, ketone-phenol-aldehyde, or ketone-phenol-resorcinol-aldehyde resin. Other objects and advantages of this invention will become apparent to those skilled in the art, from the following detailed description.

In general, the present invention provides a binder composition for composition board, which composition board is boilproof and has a high bond strength, that comprises a thermosetting water-soluble ketone-aldehyde, ketone-phenol - aldehyde, or ketone-phenol-resorcinol-aldehyde resin, amine, proteinaceous matter, and an oil-in-water emulsion.

One of the resins utilizable in the binder composition of this invention is water-soluble ammonia catalyzed ketone-aldehyde resin described in copending application Ser. No. 310,920. In general, these resins are made by condensing a ketone reactant and an aldehyde reactant (1–2 moles aldehyde reactant per mole ketone reactant) in the presence of ammonium hydroxide catalyst, at a temperature of between about 200° F. and about 350° F., and for a period of time of between about 30 minutes and about 3 hours.

The ketone-phenol-aldehyde resins described in copending application Ser. No. 354,435 are produced by condensing an aldehyde reactant, a phenol reactant, and a ketone reactant in the presence of a base catalyst. The reactants are reacted in molar proportions of between about 2 and about 8 moles aldehyde reactant per mole of phenol reactant and between about 0.5 and about 2 moles of ketone reactant per mole of phenol reactant.

The resorcinol modified resins described in Ser. No. 369,008 are prepared in a manner similar to the ketone-phenol-aldehyde resins (Ser. No. 354,435). In the modified resin, however, part of the phenol reactant is replaced by resorcinol. Other dihydric phenols are not satisfactory in such resins.

The ketone reactant used to prepare these resins are ketones having at least two hydrogen atoms on carbon atoms alpha to the carbonyl group. These ketones are the aliphatic, particularly lower alkyl, and the cycloaliphatic ketones. Non-limiting examples of the ketone reactant are acetone, methyl ethyl ketone, methyl isobutyl ketone, diethyl ketone, dihexyl ketone, cyclohexanone, acetonyl acetone, or diacetone. The preferred ketone reactant is acetone. If desired, the ketone reactant can include two or more ketones.

The aldehyde reactant used to make the resins can be formaldehyde or, in general, any compound having an active

group characteristic of aldehydes. Contemplated are the aliphatic aldehydes and aromatic aldehydes, including heterocyclic aldehydes. Non-limiting examples of the aldehyde reactant are formaldehyde (including polymer forms, e.g., paraformaldehyde), acetaldehyde, propionaldehyde, butyraldehyde, acrolein, crotonaldehyde, tiglaldehyde, benzaldehyde, salicyclaldehyde, cinnamaldehyde, glyoxal, or furfuraldehyde. Formaldehyde, being inexpensive and readily available, is preferred. Two or more aldehyde reactants can be used.

The phenol reactant used in preparing these resins can be any phenolic compound having hydrogen atoms in at least two and preferably at least three active nuclear positions, including unsubstituted phenol and substituted phenols, such as alkylphenols (in which the alkyl groups are preferably lower alkyl), e.g., cresols, xylenols, ethylphenol, propylphenol, butylphenol, amylphenol, phenylphenol, cyclohexylphenol, and mixtures thereof. Of the foregoing, meta-substituted phenols, various para-substituted phenols (e.g., p-amino phenol), and phenols which are relatively unencumbered against ring reactions are preferred phenol reactants.

The water-soluble thermosetting resin binder must be thermoset to an insoluble, infusible polymer in presence of an amine catalyst. In order to effect bonds of high strength, the viscosity of the aqueous solution of the water-soluble binder used in the compositions of this invention should be between about 5 seconds and about 9 seconds measured by the Gardner-Holt method (ASTM Designation D–1545–60) at ambient temperature (about 77° F.). Resins having viscosities below 5 seconds can be used in accordance with this invention to obtain acceptable bond strength. In both cases, the water resistance is good.

The catalysts used in the final curing step can be ammonia, dialkylamines (e.g., dimethylamine, diethylamine), polyethylene amines (e.g., diethylenetriamine, triethylenediamine), polyamides, or alkyleneimines (e.g., pyrroline, pyrrolidine, piperidone, piperazine). The amount of catalyst used to effect cure is between about 0.5 percent and about 12 percent, by weight of the resin. Generally, between about 2 percent, by weight and about 8 percent is satisfactory.

The extender or filler used in the formulation is an economical proteinaceous material. The most usual, readily-available, material is animal blood or soy flour. These proteins, however, will thicken the mixture with the aforedescribed water-soluble binders. The amount of protein used can be between about 2 percent and about 40 percent, by weight of total solids in the binder formulation.

In order to overcome the thickening action of the protein and provide sprayability, an oil-in-water emulsion is added. Such emulsions, usually mineral oil-in-water emulsions, are well known in the art. Generally they comprise mineral oil, water, oil-in-water emulsifiers, and emulsion stabilizers. Such emulsions are readily available commercially and are suitable for the present invention. The amount of oil-in-water emulsion to be used will be 5 to 20 percent by weight of total solids in the binder formulation.

In using the resin formulation of this invention for plywood, the addition of chemically alkaline clay, such as montmorillonite, can be used to provide the greater "body" used in making plywood. The amount of clay used can be between about 1 weight percent and up to as much as 70 weight percent.

Plywoods are made by coating the surfaces of thin sheets of wood with the binder composition. The coated wood sheets are then laminated one on top of another to the desired thickness, with the direction of the grain of adjacent sheets oriented at right angles. The stack of sheets of plys is then heated under pressure.

The amount of binder composition that is applied to the cellulosic material to make the plywood board will be sufficient that the finished board will contain, by weight between about 4 percent and about 30 percent of binder composition.

In general, pressures of from about 50 p.s.i.g. up to about 800 p.s.i.g. are employed. Curing will be carried out at temperatures between about 300° F. and about 400° F. The curing temperature should not exceed temperatures in the order of about 450° F., at which charring of the cellulosic material may occur. The curing time will be dependent upon the temperature and the flow characteristics of the binder. Sufficient time must be allowed to permit even flow and sufficient thermosetting to provide a board of reasonable uniformity. The period of time can vary between about 5 minutes and about 1 hour. In general practice, the curing time will be between about 12 minutes and about 15 minutes.

For composition board, particulate or fibrous material is combined with the thermosetting resin formulation. The resin-coated particles or fibers are then generally placed in a molding press in which they are molded into a compact mass of desired size and shape by the application of heat and pressure. The compactness, density and hardness of the product particle board or fiber board is governed to a great extent by the amount of pressure used. In general, pressures between about 50 p.s.i. and 800 p.s.i. are employed. Molding is usually carried out at temperatures between about 300° F. and about 425° F. If the board contains cellulosic material, the molding temperature should not exceed temperatures in the order of about 450° F. above which charring may occur. The preferred molding time will be dependent upon the temperature and the flow characteristics of the resin being cured. Time should be allowed to permit the resin to be distributed evenly and to cure sufficiently to provide a board of substantially uniform strength. The period of time can be between about 3 minutes and about 1 hour. In general practice, molding time will be between about 5 minutes and about 15 minutes.

The amount of resin formulation applied to the fibrous and/or particulate material to make the composition board should be sufficient that the finished board will contain, by weight, between about 2 percent and about 30 percent of thermoset resin composition.

The following example illustrates a typical binder utilizable in the formulations of this invention. Although an acetone-phenol-formaldehyde resin binder is used herein for specific illustrative purposes, it will be recognized that other resin binders as aforedescribed, can be used, i.e., ketone-aldehyde resins, various ketone-phenol-aldehyde resin, and resorcinol modified ketone-phenol-aldehyde resins.

EXAMPLE 1

A mixture of 116 grams (2.0 moles) of acetone, 180 grams of paraformaldehyde (6 moles of formaldehyde), 94 grams (1.0 mole) of phenol and 180 grams of water were charged to a one-liter kettle equipped with a stirrer, a thermometer and a condenser. The mixture was heated to 140° F. and 25 milliliters of 10% aqueous sodium hydroxide was continuously added over a period of 20 minutes, with the temperature rising to a reflux temperature of 185° F. in that time. The reaction mixture was refluxed for 2 hours and 10 minutes after the catalyst addition, after which the mixture was cooled to room temperature. The product was distilled under reduced pressure, removing 27.3 grams (0.47 mole) of unreacted acetone. The solids (resin) content of the resultant aqueous product was 64.7%, its pH was approximately 8.0 and it was soluble in 1.85 times its own volume of water. The amount of unreacted acetone recovered amounted to 23.5% of that charged. On the basis of the reaction of all of the formaldehyde and phenol, the molar proportions of formaldehyde:acetone:phenol in the product were 3.9:0.65:1.0. The resin solution was diluted with water to a solids content of 60%.

EXAMPLE 2

Using the resin binder of Example 1 (60% solids), two binder formulations were prepared by mixing the ingredients in the order shown in Table I. The components and the amounts thereof in these formulations are set forth in Table I. Both formulations were homogenous and readily sprayable without clogging the spray nozzle.

TABLE I

|  | 2a | | 2b | |
| --- | --- | --- | --- | --- |
|  | Parts by wt. | Percent total solids | Parts by wt. | Percent total solids |
| Resin | 100 | 66.7 | 100 | 60 |
| Ammonia, Tech | 12 | 13.3 | 13.3 | 13.3 |
| Soluble blood [1] | 20 | 8.9 | 33.2 | 13.3 |
| Oil-water emulsion [2] | 10 | 11.1 | 13.3 | 13.3 |

[1] By weight, 40% soluble blood dispersion in water using 100/1.5/1.5 ratio of blood/$CS_2$/$CCl_4$ as dispersant.
[2] By weight, 50% cylindeer oil, 1% gum ghatti, 2% lignum sulfonate, balance water.

EXAMPLES 3 AND 4

Two particle boards were made, one (Example 3) using the binder formulation of Example 2a and the other (Example 4) using the binder formulation of Example 2b. Each particle board was made by the following procedure:

Nine hundred and sixty grams of aspen flakes (average 0.015″ x 0.5″ x 1.5″ at 6% moisture content) were charged to a tumbling drum mixer. The oven dry weight of the wood was about 905 grams. An atomizing nozzle was used to apply 9.05 grams net wax (1% by wt. of wood) as a 5% wax emulsion. The flakes were dried down to 2% moisture content to flux the wax over the wood surface.

Then 102.0 grams of the resin formulation (7% solids by wt. of board) were applied by atomizing nozzle, while the flakes were being rotated in the tumbling drum. Nine hundred grams of the thus-treated flakes were manually formed as a 12″ x 18″ matte onto a steel caul plate. The matte was pre-pressed (cold pressed) at 200 p.s.i. for five minutes and then hot pressed at 350° F. for 6.5 minutes, followed by post curing at 210° F. for 48 hours. Each particle board was conditioned at 68±6° F. and 65±2% relative humidity and tested according to ASTM designation D-1037-62T. Test data are set forth in Table II.

The boiling tests are screening tests to indicate water resistance of a particle board. In the "4 Hour Boil" test, specimens are placed in boiling water for 4 hours and dried in an oven at 140° F. for 20 hours. The specimens are then reconditioned and tested for Internal Bond and Thickness Swelling. In the "6 Day Cyclic Boil" test, the 4 Hour Boil test cycle is repeated for 6 days, i.e. a total of 6 four hour boilings interspersed with 20 hour drying periods. Then, the specimens are reconditioned and tested.

TABLE II

| Board [1] | Example 3 | Example 4 |
| --- | --- | --- |
| Modulus of rupture, p.s.i | 3,238 | 3,362 |
| Internal bond, p.s.i | 106 | 100 |
| Water absorption, percent | 17 | 21 |
| Thickness swelling, percent | 11 | 14 |
| 4-hour boil: | | |
| Thickness swelling, percent | 20 | 26 |
| Internal bond retained, percent | 72 | 51 |
| 6-day cyclic boil: | | |
| Thickness swelling, percent | 25 | 30 |
| Internal bond retained, percent | 61 | 42 |

[1] Both boards were 0.5″ thick and had a density of 42 lb./cu. ft.

From the data in Table II, it will be apparent that particle boards having good bond strength and resistance to water can be made using the resin formulations of this invention. In the boiling tests, typical (commercial) specifications call for a maximum thickness swell of about 25% and a minimum internal bond strength retention of about 40%. It will be noted that both boards are satisfactory, although the board of Example 3 is somewhat better than that of Example 4.

EXAMPLE 5

Aspen fiber prepared in a production hard-board plant attrition mill was obtained and used as received at 25% moisture content. One thousand grams of the aspen fiber were charged to a tumbling mixer. A mixture was prepared containing 42.4 grams of the binder formulation of Example 2a, 6.7 grams wax emulsion (0.5% net wax), and 54.9 grams water. This mixture was applied, through a spray nozzle, to the fiber while it was rotated in the tumbling mixer. The treated fiber was then dried in the mixer to a matte moisture content of 11%. Then, 440 grams of treated fiber were manually formed as a 12″ x 18″ matte onto a caul plate. The matte was prepressed (cold pressed) at 200 p.s.i. for five minutes and then hot pressed at 380° F. for 3 minutes and post cured at 300° F. for 3 hours. The resulting 0.14″) board was conditioned at 68±6° F. at 65±2% relative humidity and tested in accordance with ASTM designation D-1037-62T. Test results are set forth in Table III, together with typical specifications for commercial hardboard.

TABLE III

| Board | Example 5 | Specification |
| --- | --- | --- |
| Modulus of rupture, p.s.i | 6,602 | 4,369 |
| Tensile strength, p.s.i | 3,563 | 2,451 |
| Water absorption, percent | 25 | 19 |
| Thickness swelling, percent | 15 | 14 |
| 4-hour boil: | | |
| Thickness swelling, percent | 79 | 38 |
| Internal bond retained, percent | 34 | 49 |
| 6-day cyclic boil: | | |
| Thickness swelling, percent | 73 | 55 |
| Internal bond retained, percent | 13 | 15 |

EXAMPLE 6

An attempt was made to prepare a binder formulation according to this invention, using a commercial phenol-formaldehyde resin binder (50% solids). The following ingredients were mixed, with stirring in the order:

|  | Parts by wt. | Percent total solids |
| --- | --- | --- |
| Resin | 100 | 62.5 |
| Ammonia, tech | 12 | 15.0 |
| Soluble Blood [1] | 20 | 10.0 |
| Oil-water Emulsion [2] | 10 | 12.5 |

[1] By weight, 40% dispersion of animal blood in water using 100/1.55 1.5 ratio of blood/$CS_2$/$CCl_4$ as dispersant.
[2] By weight, 50% cylinder oil, 1% gum ghatti, 2% lignum sulfonate, balance water.

It was found that the blood was not compatible with the resin. Both large and small particles of blood formed and some gelled on the stirrer. This formulation would have clogged the spray nozzle and would be unsatisfactory for spray application.

In the following examples, the use of soy flour (soya bean flour) as the extender is demonstrated.

EXAMPLE 7

A particle board was prepared as described in Example 3 with one exception. Instead of the soluble blood in the binder formulation of Example 2a, soy flour was used as the protein. Otherwise, the binder formulation was identical to that of Example 2a. Test data are set forth in Table IV.

EXAMPLE 8

A hardboard was prepared as described in Example 5 with one exception. Instead of the soluble blood in the binder formulation of Example 2a, soy flour was used as the protein. Otherwise the binder was identical to that of Example 2a. Test data are set forth in Table IV.

TABLE IV

|  | Example 7 [1] | Example 8 [2] |
| --- | --- | --- |
| Modulus of rupture, p.s.i | 3,072 | 4,581 |
| Internal bond, p.s.i | 100 |  |
| Tensile strength, p.s.i |  | 2,429 |
| Water absorption, percent | 21 | 36 |
| Thickness swelling, percent | 14 | 15 |
| 4-hour boil: | | |
| Thickness swelling, percent | 27 | 46 |
| Internal bond retained, percent | 75 | 40 |
| 6-day cyclic boil: | | |
| Thickness swelling, percent | 35 | 53 |
| Internal bond retained, percent | 54 | 21 |

[1] Particleboard: 0.50′ thick at 42 lb./ft.³ density.
[2] Hardboard: 0.140″ thick at 62 lb./ft.³ density.

Although the present invention has been described with preferred embodiments, it is to be understood that modifications and variations may be resorted to, without departing from the spirit and scope of this invention, as those skilled in the art will readily understand.

What is claimed is:

1. A binder formulation for composition board comprising the product obtained by mixing a thermosetting water-soluble resin selected from the group consisting of ketone-aldehyde resins, ketone-phenol-aldehyde resins, and ketone-phenol-resorcinol-aldehyde resins, a catalytic amine, proteinaceous matter selected from the group consisting of animal blood and soy flour, and a mineral oil-in-water emulsion, the amount of the mineral oil-in-water emulsion being 5 to 20% by weight of the total solids in the binder formulation.

2. The binder formulation defined in claim 1, wherein said thermosetting resin is an acetone-phenol-formaldehyde resin.

3. The binder formulation defined in claim 2, wherein said amine is ammonia, said proteinaceous matter is animal blood, and said emulsion is a mineral oil-in-water emulsion.

4. The binder formulation defined in claim 2, wherein said amine is ammonia, said proteinaceous matter is soy flour, and said emulsion is a mineral oil-in-water emulsion.

References Cited

UNITED STATES PATENTS

| | | | |
|---|---|---|---|
| 3,412,068 | 11/1968 | Gemmill et al. | 260—50 |
| 1,771,553 | 7/1930 | Arnot | 260—7 |
| 2,601,661 | 6/1952 | Kienle et al. | 260—15 |
| 2,817,639 | 12/1957 | Ash et al. | 260—7 |
| 2,825,713 | 3/1958 | Harvey et al. | 260—6 |
| 3,321,358 | 5/1967 | Campbell et al. | 260—29.2 |

WILLIAM H. SHORT, Primary Examiner

E. M. WOODBERRY, Assistant Examiner

U.S. Cl. X.R.

260—6

PO-1050
(5/69)

UNITED STATES PATENT OFFICE
CERTIFICATE OF CORRECTION

Patent No. 3,471,420         Dated October 14, 1969

Inventor(s)  CRAIG C. CAMPBELL

It is certified that error appears in the above-identified patent and that said Letters Patent are hereby corrected as shown below:

Column 6, line 9:        for  "0.14")"
                                      read --(0.14")--

Column 6, line 37:       for  "100/1.551.5"
        Ex. 6           read --100/1.5/1.5--

Column 6, line 60:       for  "Cancel line 60"

SIGNED AND
SEALED
JAN 6 - 1970

(SEAL)
Attest:

Edward M. Fletcher, Jr.                    WILLIAM E. SCHUYLER, JR.
Attesting Officer                           Commissioner of Patents